(12) United States Patent
Shazzad et al.

(10) Patent No.: US 12,513,068 B2
(45) Date of Patent: Dec. 30, 2025

(54) DISTRIBUTED COMPUTING SYSTEM FOR DETECTING FAULTS BASED ON STREAM FILTERING AND POLICING

(71) Applicant: GM Global Technology Operations LLC, Detroit, MI (US)

(72) Inventors: Khaja Shazzad, Windsor (CA); Markus Jochim, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 372 days.

(21) Appl. No.: 18/464,706

(22) Filed: Sep. 11, 2023

(65) Prior Publication Data
US 2025/0088443 A1    Mar. 13, 2025

(51) Int. Cl.
| | |
|---|---|
| *H04L 43/0823* | (2022.01) |
| *H04L 41/069* | (2022.01) |
| *H04L 43/0811* | (2022.01) |
| *H04L 43/0894* | (2022.01) |
| *H04L 67/10* | (2022.01) |

(52) U.S. Cl.
CPC ........ *H04L 43/0847* (2013.01); *H04L 41/069* (2013.01); *H04L 43/0811* (2013.01); *H04L 43/0894* (2013.01); *H04L 67/10* (2013.01)

(58) Field of Classification Search
CPC ............... H04L 43/0847; H04L 41/069; H04L 43/0811; H04L 43/0894; H04L 67/10; H04L 43/0817; H04L 49/351
See application file for complete search history.

(56) References Cited

U.S. PATENT DOCUMENTS

2022/0021603 A1*  1/2022  Qian ....................... H04L 43/16

\* cited by examiner

*Primary Examiner* — Cheikh T Ndiaye
(74) *Attorney, Agent, or Firm* — Vivacqua Crane, PLLC

(57) ABSTRACT

A distributed computing system includes one or more computing devices and one or more communication links in electronic communication with one another. Each communication link includes one or more nodes and a port switch. The one or more nodes are in electronic communication with one another by a communication link and the communication link is connected to the distributed computing system by the port switch. The port switch executes instructions to identify an online unique stream profile for a specific stream and determine an expected unique stream profile deviation during a specified interval of time. The port switch determines a difference between an offline unique stream profile and the online unique stream profile, compares an absolute value of the difference with the expected unique stream profile deviation, and in response to determining the difference is greater than the expected unique stream profile deviation, determines a fault has occurred.

20 Claims, 3 Drawing Sheets

DISTRIBUTED COMPUTING SYSTEM FOR DETECTING FAULTS BASED ON STREAM FILTERING AND POLICING

INTRODUCTION

The present disclosure relates to a distributed computing system for detecting faults based on stream filtering and policing.

Distributed computing systems include multiple computing devices, which are also referred to as nodes, that transmit and receive information over a communication link. The communication link may be implemented in hardware such as, for example, a bus-based communication network, or wirelessly. For example, a distributed computing system may employ the 10Base-T network communication protocol, where the nodes are in electronic communication with one another by a twisted pair cable.

One specific example of a distributed computing system employing the 10Base-T protocol includes one or more multidrop busses that are in communication with one or more computing devices. In the present example, the nodes may represent smart electrical devices such as, for example, smart sensors or actuators having limiting processing capabilities. The computing devices include greater processing power when compared to the nodes, and therefore functional and logical computing may take place on the computing devices. Each bus includes a port switch that connects the nodes with the remaining busses that are part of the distributed computing system and the computing devices. Sometimes one or more of the nodes or one or more of the buses that are part of the distributed computing network experience a fault that causes one or more nodes to go offline. A node may go offline because the connection between the relevant bus and the relevant node is lost, or when the relevant node becomes non-operational. The computing devices that are part of the distributed computing network are required to receive a notification when one or more nodes or the bus goes offline.

Thus, while distributed computing systems achieve their intended purpose, there is a need in the art for an approach to determine when one or more nodes or buses are no longer connected to the distributed computing system.

SUMMARY

According to several aspects, a distributed computing system includes one or more computing devices and one or more communication links in electronic communication with the one or more computing devices, where each communication link includes one or more nodes and a port switch, and the one or more nodes are in electronic communication with one another by a communication link and the communication link is connected to the distributed computing system by the port switch. The port switch executes instructions to determine the distributed computing system is online. In response to determining the distributed computing system is online, the port switch identifies an online unique stream profile for a specific stream, where the specific stream corresponds to an application executed by one of the nodes in electronic communication with the port switch during a specified interval of time. The port switch determines an expected unique stream profile deviation during a specified interval of time. At an end of the specified interval of time, the port switch determines a difference between an offline unique stream profile and the online unique stream profile, where the offline unique stream profile represents behavior of the specific stream when the distributed computing system is offline. The port switch compares an absolute value of the difference with the expected unique stream profile deviation. In response to determining the difference is greater than the expected unique stream profile deviation, the port switch determines a fault has occurred within the communication link.

In another aspect, in response to determining the fault has occurred within the communication link, the port switch transmits a notification over distributed computing system to each of the computing devices.

In yet another aspect, the fault applies to one of the following: one of the nodes and the communication link.

In an aspect, the specific stream generated by the application during specified interval of time includes a single traffic parameter.

In another aspect, the port switch determines the fault has occurred by subtracting a value of the single traffic parameter of the specific stream represented by the offline unique stream profile with a value of the single traffic parameter of the specific stream represented by the online unique stream profile to determine a single traffic parameter difference, comparing the single traffic parameter difference with the expected unique stream profile deviation, and in response to determining the single traffic parameter difference is greater than the expected unique stream profile deviation, determine the fault has occurred.

In yet another aspect, the specific stream generated by the application during specified interval of time includes more than one traffic parameter.

In an aspect, the port switch determines the fault by setting the expected unique stream profile deviation equal to a correlation factor of a first vector that represents the offline unique stream profile and a second vector that represents the online unique stream profile.

In another aspect, the expected unique stream profile deviation represents a predetermined amount of deviation that one or more traffic parameters of the specific stream tolerates without determining the fault within the communication link.

In yet another aspect, the traffic parameters include one or more of the following: packet transmission frequency, packet length, burst size, and packet priority.

In an aspect, the port switch executes per-stream filtering and policing based on the Institute of Electrical and Electronics Engineers (IEEE) 802.1Qci standard.

In another aspect, the system further comprises a switched network connecting the communication links with the one or more computing devices.

In an aspect, the communication link is a bus implemented based on the 10Base-T1 S network communication protocol.

In another aspect, a method for detecting a fault by a distributed computing system. The method comprises determining, by a port switch, the distributed computing system is online, where the distributed computing system includes one or more communication links and each communication link includes one or more nodes and a port switch, and the one or more nodes are in electronic communication with one another by the communication link and the communication link is connected to the distributed computing system by the port switch. In response to determining the distributed computing system is online, the method includes identifying, by the port switch, an online unique stream profile for a specific stream, where the specific stream corresponds to an application executed by one of the nodes in electronic communication with the port switch during a specified interval of time. The method includes determining, by the port switch, an expected unique stream profile deviation during a specified interval of time. The method further includes at an end of the specified interval of time, determining, by the port switch, a difference between an offline unique stream profile and the online unique stream profile, wherein the offline unique stream profile represents behavior of the specific stream when the distributed computing system is offline. The method includes comparing, by the port switch, an absolute value of the difference with the expected unique stream profile deviation. In response to determining the difference is greater than the expected unique stream profile deviation, the method includes determining a fault has occurred within the communication link.

In another aspect, in response to determining the fault has occurred within the communication link, the method includes transmitting, by the port switch, a notification over distributed computing system to one or more computing devices.

In yet another aspect, a distributed computing system includes one or more computing devices and one or more communication links in electronic communication with the one or more computing devices, where each communication link includes one or more nodes and a port switch, and the one or more nodes are in electronic communication with one another by a communication link and the communication link is connected to the distributed computing system by the port switch, and the port switch executes per-stream filtering and policing based on the IEEE 802.1Qci standard. The port switch executes instructions to determine the distributed computing system is online. In response to determining the distributed computing system is online, the port switch identifies an online unique stream profile for a specific stream, where the specific stream corresponds to an application executed by one of the nodes in electronic communication with the port switch during a specified interval of time. The port switch determines an expected unique stream profile deviation during a specified interval of time. At an end of the specified interval of time, the port switch determines a difference between an offline unique stream profile and the online unique stream profile, where the offline unique stream profile represents behavior of the specific stream when the distributed computing system is offline. The port switch compares an absolute value of the difference with the expected unique stream profile deviation. In response to determining the difference is greater than the expected unique stream profile deviation, the port switch determines a fault has occurred within the communication link. In response to determining the fault has occurred within the communication link, the port switch transmits a notification over distributed computing system to each of the computing devices.

In another aspect, the fault applies to one of the following: one of the nodes and the communication link.

In yet another aspect, the specific stream generated by the application during specified interval of time includes a single traffic parameter.

In an aspect, the port switch determines the fault has occurred by subtracting a value of the single traffic parameter of the specific stream represented by the offline unique stream profile with a value of the single traffic parameter of the specific stream represented by the online unique stream profile to determine a single traffic parameter difference, comparing the single traffic parameter difference with the expected unique stream profile deviation, and in response to determining the single traffic parameter difference is greater than the expected unique stream profile deviation, determine the fault has occurred.

In another aspect, the specific stream generated by the application during specified interval of time includes more than one traffic parameter.

In yet another aspect, the port switch determines the fault by setting the expected unique stream profile deviation equal to a correlation factor of a first vector that represents the offline unique stream profile and a second vector that represents the online unique stream profile.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
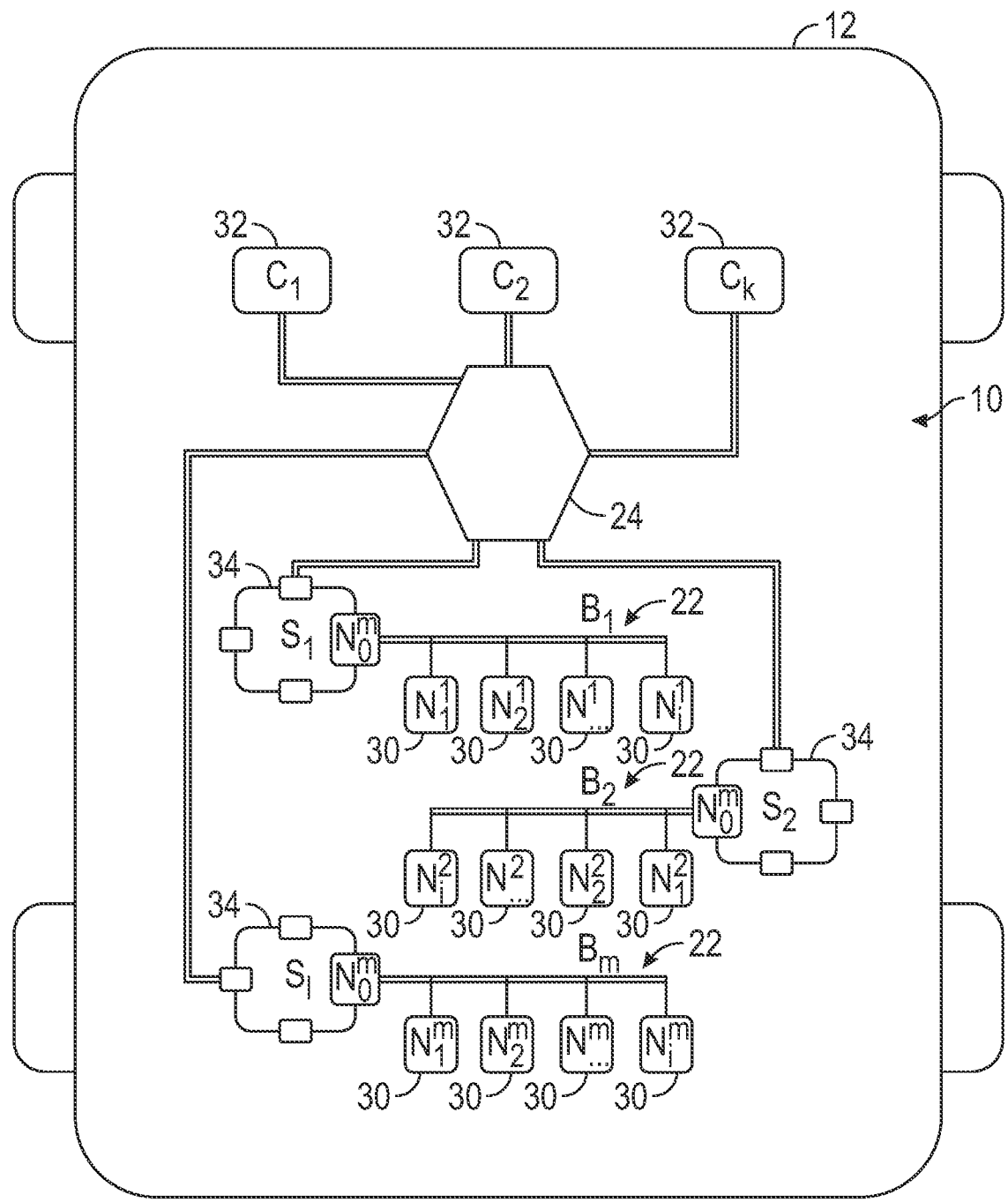
FIG. 1 is a schematic diagram of a vehicle including the disclosed distributed computing system including one or more computing devices and one or more communication links including one or more nodes, according to an exemplary embodiment.

Referring to FIG. 1, a schematic diagram illustrating an exemplary distributed computing system 10 that is part of a vehicle 12 is shown. In the non-limiting embodiment as shown in FIG. 1, the distributed computing system 10 is implemented as part of a vehicle such as, but not limited to, a sedan, truck, sport utility vehicle, van, or motor home. However, it is to be appreciated that FIG. 1 is merely exemplary in nature and the disclosed distributed computing system 10 is not limited to a vehicle. Indeed, the distributed computing system 10 may be implemented in a variety of other applications such as, for example, industrial automation control systems and the Internet of things (IoT).

The distributed computing system 10 includes one or more communication links 22 that are in electronic communication with one another by a switched network 24. The switched network 24 includes a plurality of interconnected switches or a single switch. The one or more communication links 22 are also in electronic communication with one or more computing devices 32. Each communication link 22 is connected to the distributed computing system 10 through a port of a switch, where each port is referred to as and is shown in FIG. 1 as a port switch 34. In the event a wireless protocol is employed, the port switch 34 is a wireless access point.

In the embodiment as shown in FIG. 1, the distributed computing system 10 includes three communication links 22 and three computing devices 32, however, it is to be appreciated that FIG. 1 is merely exemplary in nature. The communication links 22 are implemented either in hardware, such as a bus communication system, or wirelessly. In the non-limiting embodiment as shown in FIG. 1, the communication link 22 is a bus implemented based on the 10Base-T1S network communication protocol. In another embodiment, the network communication protocol is based on switched Ethernet.

The communication links 22 each include up to an i number of nodes 30, where i is any whole number greater than zero. In other words, the communication links 22 each include one or more nodes 30. In the embodiment as shown in FIG. 1 where the communication links 22 are implemented based on the 10Base-T1S network communication protocol, each communication link 22 may include up to eight nodes 30 or i=8, however, it is to be appreciated that a maximum number of nodes 30 supported by each communication link 22 varies based on the network communication protocol. In one non-limiting embodiment, the nodes 20 may represent devices such as, for example, smart sensors and smart actuators having limited computing power. It is to be appreciated that in embodiments, the one or more computing devices 32 include greater processing power when compared to the nodes 30, and therefore functional and logical computing of the distributed computing system 10 may occur on the computing devices 32.

The nodes 30 are denoted as $N_0^m, N_2^m, \ldots N_i^m$, where m denotes a total number of communication links 22 included as part of the distributed computing system 10 and m>0. The communication links 22 are each denoted as $B_1, B_2, \ldots B_m$, the port switches 32 are each denoted as $S_1, S_2, \ldots S_l$, and the one or more computing devices 32 are denoted as $C_1, C_2, \ldots C_k$, where l denotes a total number of port switches 34 and k denotes a total number of computing devices 32 included as part of the distributed computing system 10.

Figure 2A:
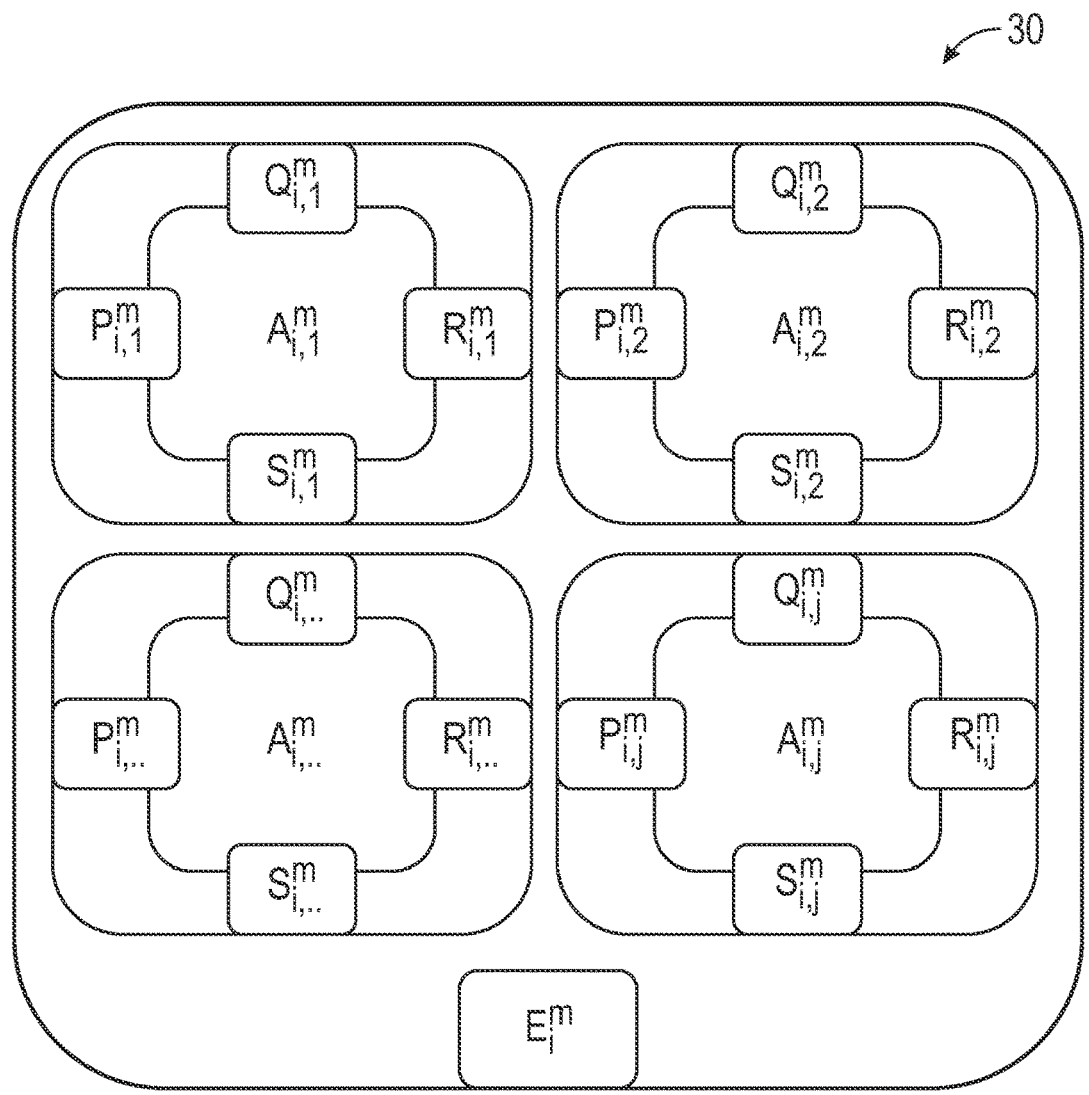
FIG. 2A is a software diagram of one of the nodes that are part of the distributed computing system shown in FIG. 1, according to an exemplary embodiment.

FIG. 2A is a software diagram of one of the nodes 30 of the distributed computing system 10, where the node 30 is denoted as $N_i^m$. Each node 30 executes up to j number of applications $A_{i,j}^m$, where the application $A_{i,j}^m$ is in the form of service, and j is any whole number greater than zero, or j>0. Each node 30 includes a physical address $E_i^m$, which is a unique value to the distributed computing system 10. For example, in the embodiment as shown in the figures where the communication links 22 are implemented based on the 10Base-T1S network communication protocol, the physical address $E_i^m$ is a media access control (MAC) address. Each application $A_{i,j}^m$ of a specific node 30 includes a port value $P_{i,j}^m$ that is unique to each application $A_{i,j}^m$ for a specific node 30. $Q_{i,j}^m$ denotes a service identifier of the application $A_{i,j}^m$ and is unique for a specific service that the application $A_{i,j}^m$ is executing. $R_{i,j}^m$ denotes a service instance identifier of the application $A_{i,j}^m$ and is unique for a specific service instance of the service identifier $Q_{i,j}^m$. $S_{i,j}^m$ denotes a stream generated by the application $A_{i,j}^m$.

Figure 2B:
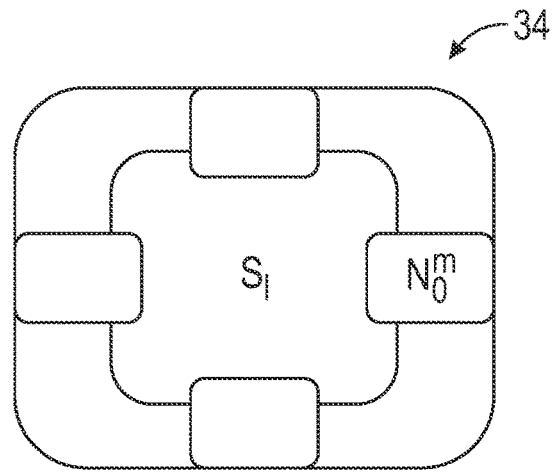
FIG. 2B is a software diagram of an Ethernet switch that is part of the distributed computing system shown in FIG. 1, according to an exemplary embodiment.

FIG. 2B is a software diagram of an exemplary Ethernet switch that represents one of the port switches 32, which is denoted as $S_l$. It is to be appreciated that each port switch 34 that is part of the distributed computing system 10 executes per-stream filtering and policing based on the Institute of Electrical and Electronics Engineers (IEEE) 802.1Qci standard. It is also to be appreciated that each port switch 34 that is part of the distributed computing system 10 is configured to generate and forward notifications to the computing devices 32 based on both a unicast and a multicast approach.

The port switches 34 each include one or more processors for executing the per-stream filtering and policing. For example, in one embodiment, the port switches 34 include one or more central processing units (CPUs) based on a reduced instruction set computer (RISC) architecture.

Referring to FIGS. 1, 2A, and 2B, an offline unique stream profile $\Pi_{i,j}^m$ represents behavior of a specific stream $S_{i,j}^m$ generated by an application $A_{i,j}^m$ executed by a specific node 30 during a specified interval of time $\Delta T_{i,j}^m$ when the distributed computing system 10 is offline. It is to be appreciated that the offline unique stream profile $\Pi_{i,j}^m$ may be updated when the distributed computing system 10 is online by a software update of the port switches 34. The offline unique stream profile $\Pi_{i,j}^m$ is defined during the design time of the distributed computing system 10, and each port switch 34 has knowledge of the offline unique stream profile $\Pi_{i,j}^m$. The offline unique stream profile $\Pi_{i,j}^m$ is a function of a corresponding physical address $E_i^m$, a corresponding port value $P_{i,j}^m$, a corresponding service identifier $Q_{i,j}^m$, and a corresponding service instance identifier $\Pi_{i,j}^m$ of the specific node 30, or $\Pi_{i,j}^m = f(E_i^m, P_{i,j}^m, Q_{i,j}^m, S_{i,j}^m)$. The offline unique stream profile $\Pi_{i,j}^m$ indicates one or more traffic parameters for the specific stream $S_{i,j}^m$. Some examples of traffic parameters include, but are not limited to, packet transmission frequency, packet length, burst size, and packet priority. It is to be appreciated that the offline unique stream profile $\Pi_{i,j}^m$ may be a scalar value or a multi-dimensional vector depending on the number of traffic parameters included.

It is to be appreciated that the communication link 22 includes multidrop topology. Therefore, each stream generated by a node 30 that is part of a specific communication link 22 passes through the corresponding port switch 34. An online unique stream profile $\pi_{i,j}^m$ for the specific stream $S_{i,j}^m$ is detected and identified by the port switch 34 once the distributed computing system 10 goes online. Specifically, each stream $S_{i,j}^m$ generated by one of the nodes 30 of the distributed computing system 10 passes through a corresponding port switch 34 and is detected and identified by the corresponding port switch 34 based on the IEEE 802.1Qci standard. The corresponding port switch 34 detects the online unique stream profile $\pi_{i,j}^m$ for a corresponding unique stream $S_{i,j}^m$, where the online unique stream profile $\pi_{i,j}^m$ includes identical dimensions as the offline unique stream profile $\Pi_{i,j}^m$. It is to be appreciated that during design time, and by the time the distributed computing system 10 goes online (i.e., goes on the air), each port switch 34 of the distributed computing system 10 is configured with a unique stream and stream profile, where the stream refers to a data flow and the stream profile refers to a specific traffic behavior that a unique stream follows. The offline unique stream profile $\Pi_{i,j}^m$ for the specific stream $S_{i,j}^m$ is configured in the corresponding port switch $S_l$ connected to the communication link $B_m$ for all applications $A_{i,j}^m$ executed by each node 30 that is part of the communication link $B_m$.

A port switch 34 that corresponds to the relevant communication link 33 determines an expected unique stream profile deviation $\Delta\Pi_{i,j}^m$ during the specified interval of time $\Delta T_{i,j}^m$, where the expected unique stream profile deviation $\Delta\Pi_{i,j}^m$ represents a predetermined amount of deviation that the one or more traffic parameters of the specific stream $S_{i,j}^m$ tolerates without determining a fault $F_{i,j}^m$ within the corresponding communication link 22. The predetermined amount of deviation is determined when the distributed computing system 10 is offline. It is to be appreciated that the predetermined amount of deviation varies based on the accuracy required by a specific application that the distributed computing system 10 is implemented upon. It is to be appreciated that in embodiments, one or more nodes 30 may be unable to generate a regular stream profile. In this scenario, a low resource-consuming application $A_{i,j}{}^m$ may be used instead, or a synthetic stream profile may be determined in place of the regular stream profile.

At the end of the specified interval of time $\Delta T_{i,j}{}^m$, the corresponding port switch 34 determines a difference between the offline unique stream profile $\Pi_{i,j}{}^m$ and the online unique stream profile $\pi_{i,j}{}^m$, and compares an absolute value of the difference with the expected unique stream profile deviation $\Delta\Pi_{i,j}{}^m$. In response to determining the difference between the offline unique stream profile $\Delta\Pi_{i,j}{}^m$ and the online unique stream profile $\pi_{i,j}{}^m$ is greater than the expected unique stream profile deviation $\Delta\Pi_{i,j}{}^m$, the corresponding port switch 34 determines a fault $F_{i,j}{}^m$ has occurred within the communication link 22, which is expressed as $|\Pi-\pi|>\Delta\Pi|$. Specifically, the fault $F_{i,j}{}^m$ applies to a particular application $A_{i,j}{}^m$ that is executed by one of the nodes 30 that are part of the communication link 22. In response to determining the fault $F_{i,j}{}^m$, the corresponding port switch 34 transmits a notification over distributed computing system 10 to each of the computing devices 32 that are part of the distributed computing system 10. The notification indicates the fault $F_{i,j}{}^m$ has occurred.

It is to be appreciated that the fault $F_{i,j}{}^m$ applies to one of the nodes 30 that are part of a specific communication link 22 or the specific communication link 22 itself. If the fault $F_{i,j}{}^m$ is present for all the applications executed by a particular node 30 of the specific communication link 22, then the fault $F_{i,j}{}^m$ applies to the particular node 30. However, if the fault $F_{i,j}{}^m$ is present for all the applications for executed by all the nodes 30 that are part of the specific communication link 22, then the fault $F_{i,j}{}^m$ applies to the specific communication link 22.

Determining the fault $F_{i,j}{}^m$ by the specific communication link 22 shall now be described. It is to be appreciated that if the specific stream $S_{i,j}{}^m$ generated by the application $A_{i,j}{}^m$ during specified interval of time $\Delta T_{i,j}{}^m$ includes a single traffic parameter, then the port switch 34 determines the fault $F_{i,j}{}^m$ has occurred by subtracting a value of the single traffic parameter of the specific stream represented by the offline unique stream profile $\Pi_{i,j}{}^m$ with a value of the single traffic parameter of the specific stream represented by the online unique stream profile $\pi_{i,j}{}^m$ to determine a single traffic parameter difference, and compares the single traffic parameter difference with the expected unique stream profile deviation $\Delta\Pi_{i,j}{}^m$. In response to determining the single traffic parameter difference is greater than the expected unique stream profile deviation $\Delta\Pi_{i,j}{}^m$, the port switch 34 determines the fault $F_{i,j}{}^m$ has occurred. In the present example, the expected unique stream profile deviation $\Delta\Pi_{i,j}{}^m$ is equal to the predetermined amount of deviation that the single traffic parameters of the specific stream $S_{i,j}{}^m$ tolerates without determining a fault $F_{i,j}{}^m$ has occurred. Determining the fault $F_{i,j}{}^m$ is expressed in Equation 1 as:

$$|W-w|>\Delta W \qquad \text{Equation 1}$$

where W represent the value of the single traffic parameter of the specific stream represented by the offline unique stream profile $\Pi_{i,j}{}^m$, w represents the value of the single traffic parameter of the specific stream represented by the online unique stream profile $\pi_{i,j}{}^m$, $\Delta W$ represents the predetermined amount of deviation that the single traffic parameters of the specific stream $S_{i,j}{}^m$ tolerates without determining a fault $F_{i,j}{}^m$ has occurred, and W and w are both elements of the service instance identifier $R_{i,j}{}^m$ of the application $A_{i,j}{}^m$, or $W \in R_{i,j}{}^m$, $w \in R_{i,j}{}^m$, where $R_{i,j}{}^m$ represents a set of real numbers.

If the specific stream $S_{i,j}{}^m$ generated by the application $A_{i,j}{}^m$ during the specified interval of time $\Delta T_{i,j}{}^m$ includes more than one traffic parameter, then the port switch 34 determines the fault $F_{i,j}{}^m$ by setting the expected unique stream profile deviation $\Delta\Pi_{i,j}{}^m$ equal to a correlation factor of a first vector that represents the offline unique stream profile $\Pi_{i,j}{}^m$ and a second vector that represents the online unique stream profile $\Pi_{i,j}{}^m$. Specifically, in one example, the first vector is expressed as a multi-dimensional vector [W,L] where W represents a first traffic parameter and L represents a second traffic parameter, and $\Pi_{i,j}{}^m=[W,L]$ where $[W,L] \in R_{i,j}{}^{m2}$ where $R_{i,j}{}^{m2}$ represents a set of real numbers. The second vector is expressed as a multi-dimensional vector [w, l] where w represents the first traffic parameter, l represents a second traffic parameter, and $\pi_{i,j}{}^m=[w, l]$ where $[w, l] \in R_{i,j}{}^{m2}$. In one embodiment, the correlation factor is equal to $\cos(\pi/4)$, however, it is to be appreciated that the correlation factor may range in value from 0 to 1. In one embodiment, the port switch 34 determines the fault $F_{i,j}{}^m$ has occurred when Equation 2 is true, where Equation 2 is expressed as:

$$\left|1 - \frac{Ww+Ll}{\sqrt{W^2+L^2}\sqrt{w^2+l^2}}\right| > \text{correlation factor} \qquad \text{Equation 2}$$

In one embodiment, the port switch 34 determines the fault $F_{i,j}{}^m$ when Equation 3 is true, where Equation 3 is expressed as:

$$\left|1 - \frac{dot\left(\prod_{i,j,}^m \pi_{i,j}^m\right)}{\left|\prod_{i,j,}^m\right|\left|\pi_{i,j}^m\right|}\right| > \text{correlation factor} \qquad \text{Equation 3}$$

Figure 3:
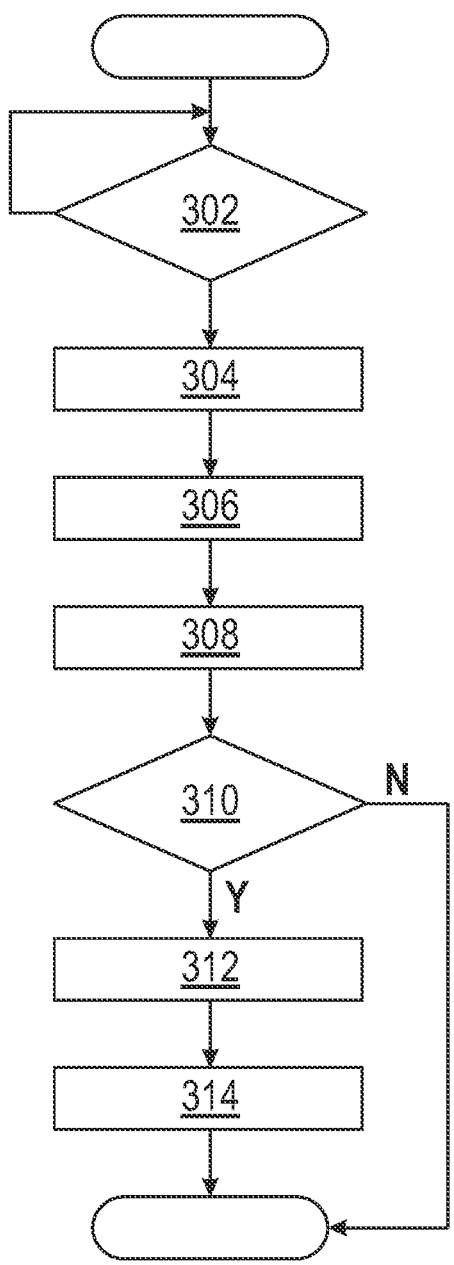
FIG. 3 is a process flow diagram illustrating a method for detecting a fault within one of the communication links that are part of the distributed computing system, according to an exemplary embodiment.

FIG. 3 is a process flow diagram illustrating a method 300 for detecting a fault $F_{i,j}{}^m$ within one of the communication links 22 or a node 30 that are part of the distributed computing system 10. Referring generally to FIGS. 1, 2A, 2B, and 3, the method 300 may begin at decision block 302. In decision block 302, the port switch 34 of one of the communication links 22 continues to monitor the communication link 22 until the distributed computing system 10 is online. Once the port switch 34 determines the distributed computing system is online, the method 300 may proceed to block 304.

In block 304, in response to determining the distributed computing system 10 is online, the port switch 34 identifies the online unique stream profile $\pi_{i,j}{}^m$ for the specific stream $S_{i,j}{}^m$, wherein the specific stream $S_{i,j}{}^m$ corresponds to an application $A_{i,j}{}^m$ executed by one of the nodes 30 in electronic communication with the port switch 34 during the specified interval of time $\Delta T_{i,j}{}^m$. The method 300 may proceed to block 306.

In block 306, the port switch determines the expected unique stream profile deviation $\Delta\Pi_{i,j}{}^m$ during the specified interval of time $\Delta T_{i,j}{}^m$. The method may then proceed to block 308.

In block 308, at the end of the specified interval of time $\Delta T_{i,j}{}^m$ the port switch 34 determines a difference between an offline unique stream profile $\Pi_{i,j}{}^m$ and the online unique stream profile $\pi_{i,j}{}^m$, where the offline unique stream profile $\Pi_{i,j}{}^m$ represents behavior of the specific stream $S_{i,j}{}^m$ when the distributed computing system 10 is offline. The method 300 may then proceed to decision block 310.

In decision block 310, the port switch 34 compares an absolute value of the difference with the expected unique stream profile deviation $\Delta\Pi_{i,j}{}^m$. In response to determining the difference is less than or equal to the expected unique stream profile deviation $\Delta\Pi_{i,j}{}^m$, the port switch 34 determines no faults have occurred and the method 300 may terminate.

In response to determining the difference is greater than the expected unique stream profile deviation $\Delta\Pi_{i,j}{}^m$, the method 300 may proceed to block 312. In block 312, the port switch determines the fault $F_{i,j}{}^m$ has occurred within the communication link 22. The method 300 may then proceed to block 314.

In block 314, the port switch 34 transmits a notification over distributed computing system to each of the computing devices 32, where the notification indicates the fault $F_{i,j}{}^m$ has occurred. The method 300 may then terminate.

Referring generally to the figures, the disclosed distributed computing system provides various technical effects and benefits. Specifically, the distributed computing system provides an approach for utilizing existing per-stream filtering and policing methods to detect faults within a communication link. It is to be appreciated that since the disclosed approach for detecting the fault utilizes standard per-stream filtering and policing that is already in place within the system, no additional hardware is required. The disclosed approach may result in improved detection times as well as improved bandwidth when compared to existing approaches, since no additional packet transmission is required to detect the fault.

The port switches and computing devices may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A distributed computing system, comprising:
one or more computing devices; and
one or more communication links in electronic communication with the one or more computing devices, wherein each communication link includes one or more nodes and a port switch, and wherein the one or more nodes are in electronic communication with one another by a communication link and the communication link is connected to the distributed computing system by the port switch, wherein the port switch executes instructions to:
determine the distributed computing system is online;
in response to determining the distributed computing system is online, identify an online unique stream profile for a specific stream, wherein the specific stream corresponds to an application executed by one of the nodes in electronic communication with the port switch during a specified interval of time;
determine an expected unique stream profile deviation during a specified interval of time;
at an end of the specified interval of time, determine a difference between an offline unique stream profile and the online unique stream profile, wherein the offline unique stream profile represents behavior of the specific stream when the distributed computing system is offline;
compare an absolute value of the difference with the expected unique stream profile deviation; and
in response to determining the difference is greater than the expected unique stream profile deviation, determine a fault has occurred within the communication link.

2. The distributed computing system of claim 1, wherein the port switch executes instructions to:
in response to determining the fault has occurred within the communication link, transmit a notification over distributed computing system to each of the computing devices.

3. The distributed computing system of claim 1, wherein the fault applies to one of the following: one of the nodes and the communication link.

4. The distributed computing system of claim 1, wherein the specific stream generated by the application during specified interval of time includes a single traffic parameter.

5. The distributed computing system of claim 4, wherein the port switch determines the fault has occurred by:
subtracting a value of the single traffic parameter of the specific stream represented by the offline unique stream profile with a value of the single traffic parameter of the specific stream represented by the online unique stream profile to determine a single traffic parameter difference;
comparing the single traffic parameter difference with the expected unique stream profile deviation; and
in response to determining the single traffic parameter difference is greater than the expected unique stream profile deviation, determine the fault has occurred.

6. The distributed computing system of claim 1, wherein the specific stream generated by the application during specified interval of time includes more than one traffic parameter.

7. The distributed computing system of claim 6, wherein the port switch determines the fault by setting the expected unique stream profile deviation equal to a correlation factor of a first vector that represents the offline unique stream profile and a second vector that represents the online unique stream profile.

8. The distributed computing system of claim 1, wherein the expected unique stream profile deviation represents a predetermined amount of deviation that one or more traffic parameters of the specific stream tolerates without determining the fault within the communication link.

9. The distributed computing system of claim 8, wherein the traffic parameters include one or more of the following: packet transmission frequency, packet length, burst size, and packet priority.

10. The distributed computing system of claim 1, wherein the port switch executes per-stream filtering and policing based on the Institute of Electrical and Electronics Engineers (IEEE) 802.1Qci standard.

11. The distributed computing system of claim 1, further comprising a switched network connecting the communication links with the one or more computing devices.

12. The distributed computing system of claim 1, wherein the communication link is a bus implemented based on the 10Base-T1S network communication protocol.

13. A method for detecting a fault by a distributed computing system, the method comprising:
 determining, by a port switch, the distributed computing system is online, wherein the distributed computing system includes one or more communication links and each communication link includes one or more nodes and a port switch, and wherein the one or more nodes are in electronic communication with one another by the communication link and the communication link is connected to the distributed computing system by the port switch;
 in response to determining the distributed computing system is online, identifying, by the port switch, an online unique stream profile for a specific stream, wherein the specific stream corresponds to an application executed by one of the nodes in electronic communication with the port switch during a specified interval of time;
 determining, by the port switch, an expected unique stream profile deviation during a specified interval of time;
 at an end of the specified interval of time, determining, by the port switch, a difference between an offline unique stream profile and the online unique stream profile, wherein the offline unique stream profile represents behavior of the specific stream when the distributed computing system is offline;
 comparing, by the port switch, an absolute value of the difference with the expected unique stream profile deviation; and
 in response to determining the difference is greater than the expected unique stream profile deviation, determining a fault has occurred within the communication link.

14. The method of claim 13, further comprising:
 in response to determining the fault has occurred within the communication link, transmitting, by the port switch, a notification over distributed computing system to one or more computing devices.

15. A distributed computing system, comprising:
 one or more computing devices; and
 one or more communication links in electronic communication with the one or more computing devices, wherein each communication link includes one or more nodes and a port switch, and wherein the one or more nodes are in electronic communication with one another by a communication link and the communication link is connected to the distributed computing system by the port switch, and wherein the port switch executes per-stream filtering and policing based on the IEEE 802.1Qci standard, and wherein the port switch executes instructions to:
 determine the distributed computing system is online;
 in response to determining the distributed computing system is online, identify an online unique stream profile for a specific stream, wherein the specific stream corresponds to an application executed by one of the nodes in electronic communication with the port switch during a specified interval of time;
 determine an expected unique stream profile deviation during a specified interval of time;
 at an end of the specified interval of time, determine a difference between an offline unique stream profile and the online unique stream profile, wherein the offline unique stream profile represents behavior of the specific stream when the distributed computing system is offline;
 compare an absolute value of the difference with the expected unique stream profile deviation;
 in response to determining the difference is greater than the expected unique stream profile deviation, determine a fault has occurred within the communication link; and
 in response to determining the fault has occurred within the communication link, transmit a notification over distributed computing system to each of the computing devices.

16. The distributed computing system of claim 15, wherein the fault applies to one of the following: one of the nodes and the communication link.

17. The distributed computing system of claim 15, wherein the specific stream generated by the application during specified interval of time includes a single traffic parameter.

18. The distributed computing system of claim 17, wherein the port switch determines the fault has occurred by:
 subtracting a value of the single traffic parameter of the specific stream represented by the offline unique stream profile with a value of the single traffic parameter of the specific stream represented by the online unique stream profile to determine a single traffic parameter difference;
 comparing the single traffic parameter difference with the expected unique stream profile deviation; and
 in response to determining the single traffic parameter difference is greater than the expected unique stream profile deviation, determine the fault has occurred.

19. The distributed computing system of claim 15, wherein the specific stream generated by the application during specified interval of time includes more than one traffic parameter.

20. The distributed computing system of claim 19, wherein the port switch determines the fault by setting the expected unique stream profile deviation equal to a correlation factor of a first vector that represents the offline unique stream profile and a second vector that represents the online unique stream profile.

* * * * *